US011572036B1

(12) United States Patent
Gilbert

(10) Patent No.: US 11,572,036 B1
(45) Date of Patent: Feb. 7, 2023

(54) VEHICLE THEFT PREVENTION DEVICE

(71) Applicant: Travis Gilbert, Elkhorn, NE (US)

(72) Inventor: Travis Gilbert, Elkhorn, NE (US)

( * ) Notice: Subject to any disclaimer, the term of this patent is extended or adjusted under 35 U.S.C. 154(b) by 0 days.

(21) Appl. No.: 17/408,440

(22) Filed: Aug. 22, 2021

(51) Int. Cl.
*B60R 25/04* (2013.01)

(52) U.S. Cl.
CPC .................................. *B60R 25/04* (2013.01)

(58) Field of Classification Search
CPC ..................................................... B60R 25/04
See application file for complete search history.

(56) References Cited

U.S. PATENT DOCUMENTS

| 4,485,887 | A | * | 12/1984 | Morano | ................ | B60R 25/045 |
| | | | | | | 307/10.3 |
| 2004/0124707 | A1 | * | 7/2004 | Boggs | .................... | B60R 25/04 |
| | | | | | | 307/10.5 |

FOREIGN PATENT DOCUMENTS

CN          1075238 C  * 11/2001  ......... H01H 71/7418

* cited by examiner

*Primary Examiner* — Jacob M Amick
*Assistant Examiner* — Charles J Brauch
(74) *Attorney, Agent, or Firm* — The Iwashko Law Firm, PLLC; Lev Ivan Gabriel Iwashko

(57) ABSTRACT

A vehicle theft prevention device detachably connected to a vehicle, the vehicle theft prevention device including a switch assembly, and an ignition disabler assembly connected to the switch assembly and the vehicle to complete a circuit between an ignition switch and an electronics system of the vehicle in response to depressing the switch assembly, and prevent start of the vehicle using a vehicle key while the circuit between the ignition switch and the electronics system is incomplete.

8 Claims, 4 Drawing Sheets

VEHICLE THEFT PREVENTION DEVICE

BACKGROUND

1. Field

The present general inventive concept relates generally to vehicle theft prevention, and particularly, to a vehicle theft prevention device.

2. Description of the Related Art

Vehicle theft affects many people worldwide on a daily basis. Although all vehicles are susceptible to theft, older vehicles have a higher chance of being stolen because they lack newer anti-theft technology that becomes the new standard in modern vehicles. With respect to older models, a thief is able to bypass the ignition and hot-wire the vehicle to operate its functions and steal the vehicle with ease. Thus, a vehicle owner of an older vehicle is at a greater risk of theft.

Current solutions, such as a camera system only record an image and/or a video of the theft, but does not prevent the theft from happening. Although the camera system provides a deterrent, if the vehicle is stolen, then the owner may never recover the vehicle.

Therefore, there is a need for a vehicle theft prevention device that prevents the vehicle from being stolen.

SUMMARY

The present general inventive concept provides a vehicle theft prevention device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a vehicle theft prevention device detachably connected to a vehicle, the vehicle theft prevention device including a switch assembly, and an ignition disabler assembly connected to the switch assembly and the vehicle to complete a circuit between an ignition switch and an electronics system of the vehicle in response to depressing the switch assembly, and prevent start of the vehicle using a vehicle key while the circuit between the ignition switch and the electronics system is incomplete.

The switch assembly may include a switch body, a connection switch movably disposed on and within at least a portion of a first end of the switch body to move from extended away from the switch body in a first position to at least partially within the switch body in a second position in response to being depressed, and move from depressed within the switch body in the second position to extended away from the switch body in the first position, and a contact surface movably disposed on and within at least a portion of a second end of the switch body and connected to at least a portion of the connection switch to move in response to movement of the connection switch.

The switch assembly may further include a disable unit disposed within at least a portion of the switch body to emit a transponder signal to the vehicle that a circuit is completed in response to depressing the connection switch, and prevent turning on the vehicle using a vehicle key or bypassing the disable unit unless the contact surface completes the circuit.

The ignition disabler assembly may include a disabler body to receive the contact surface through a first end of the disabler body, and a wire contact surface disposed within at least portion of a second end of the disabler body to connect to the contact surface in response to depressing the connection switch.

The contact surface may be disposed a distance away from the wire contact surface while the connection switch is in the first position.

The ignition disabler assembly may further include a plurality of wires disposed on at least a portion of the disabler body to connect the wire contact surface to the ignition switch and the electronics system of the vehicle.

The vehicle theft prevention device may further include a cover assembly detachably connected to the ignition disabler assembly to at least partially cover the ignition disabler assembly.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
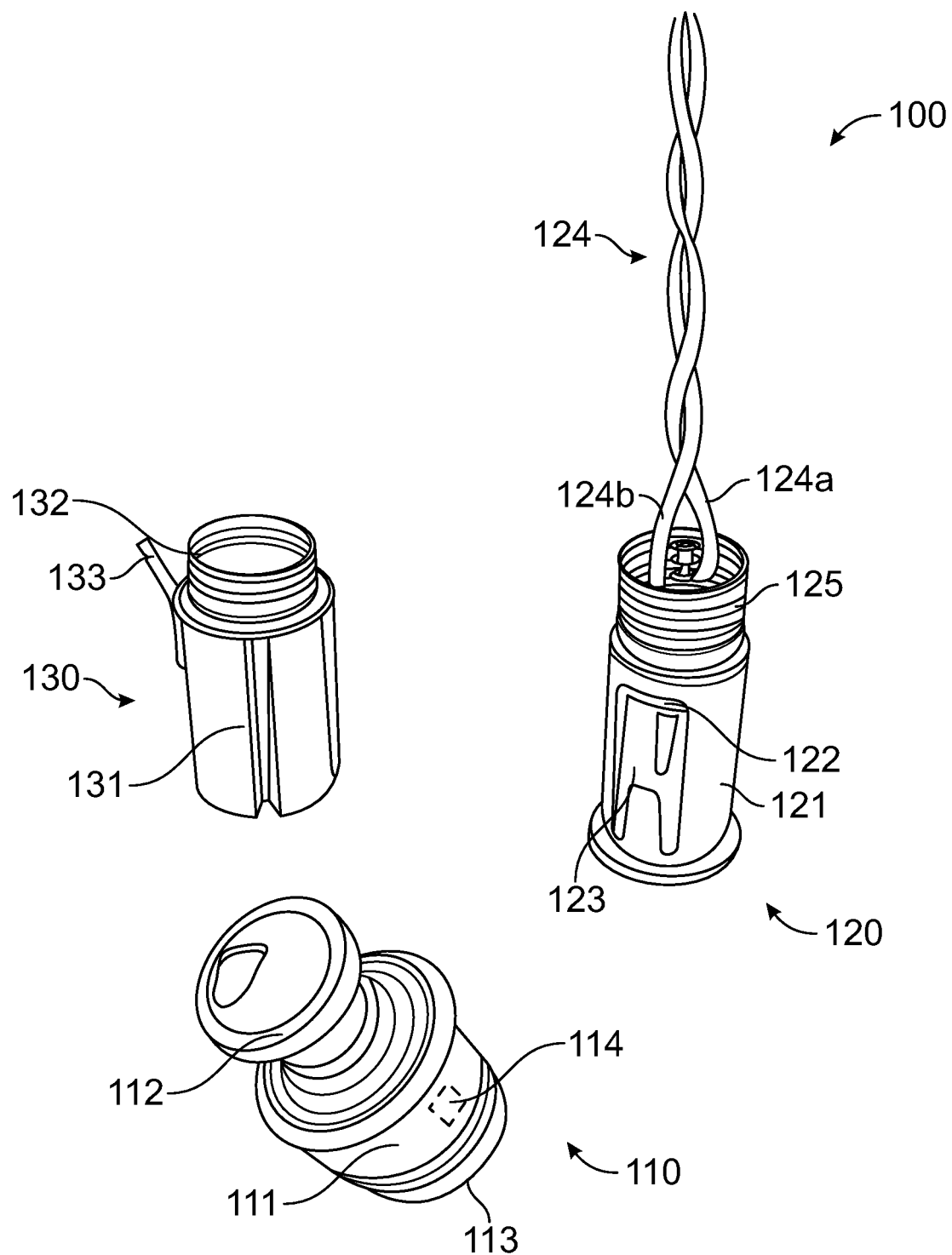
FIG. 1 illustrates an exploded view of a vehicle theft prevention device, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Vehicle Theft Prevention Device 100
Switch Assembly 110
Switch Body 111
Connection Switch 112
Contact Surface 113
Disable Unit 114
Ignition Disabler Assembly 120
Disabler Body 121
Wire Contact Surface 122
Aperture 123
Connecting Wires 124
First Wire 124*a*
Second Wire 124*b*
First Connector 124*c*
Second Connector 124*d*
Threaded Surface 125
Cover Assembly 130
Cover Body 131
Threaded Surface 132
Latching Portion 133

FIG. 1 illustrates an exploded view of a vehicle theft prevention device 100, according to an exemplary embodiment of the present general inventive concept.

Figure 2:
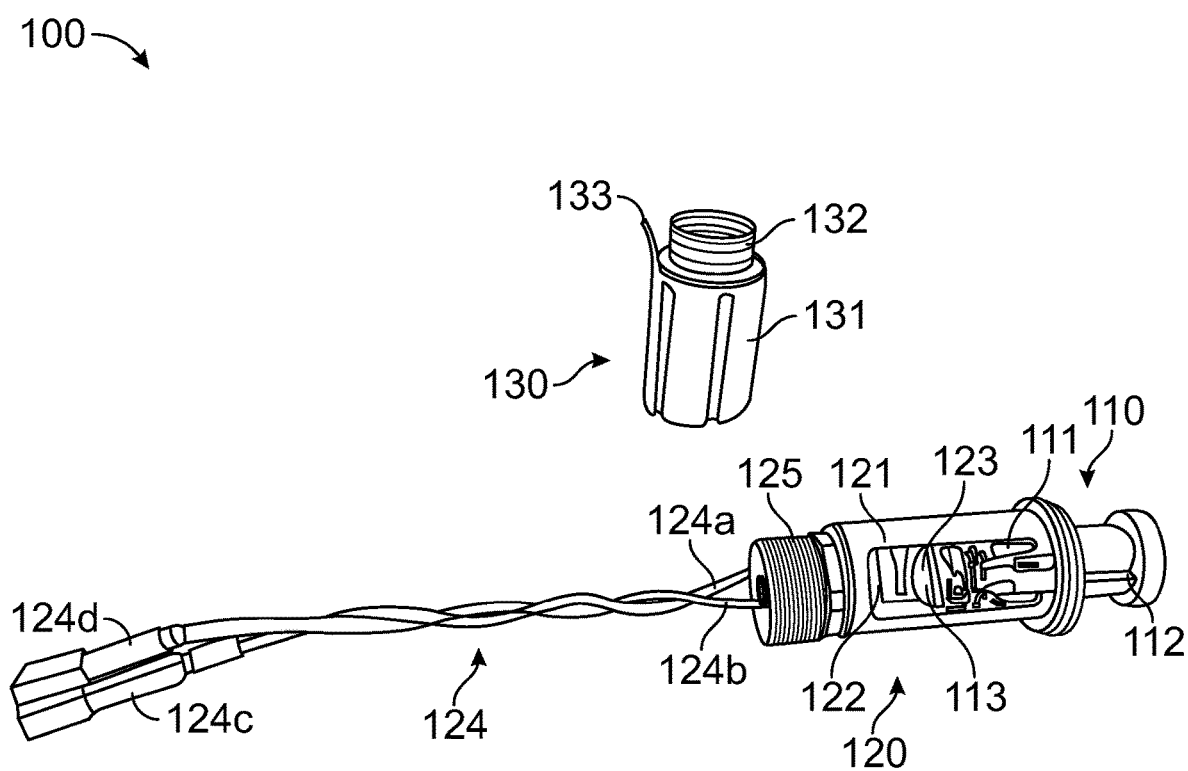
FIG. 2 illustrates an exploded view of the vehicle theft prevention device with a switch assembly connected to an ignition disabler assembly, according to an exemplary embodiment of the present general inventive concept.

FIG. 2 illustrates an exploded view of the vehicle theft prevention device 100 with a switch assembly 110 connected to an ignition disabler assembly 120, according to an exemplary embodiment of the present general inventive concept.

Figure 3:
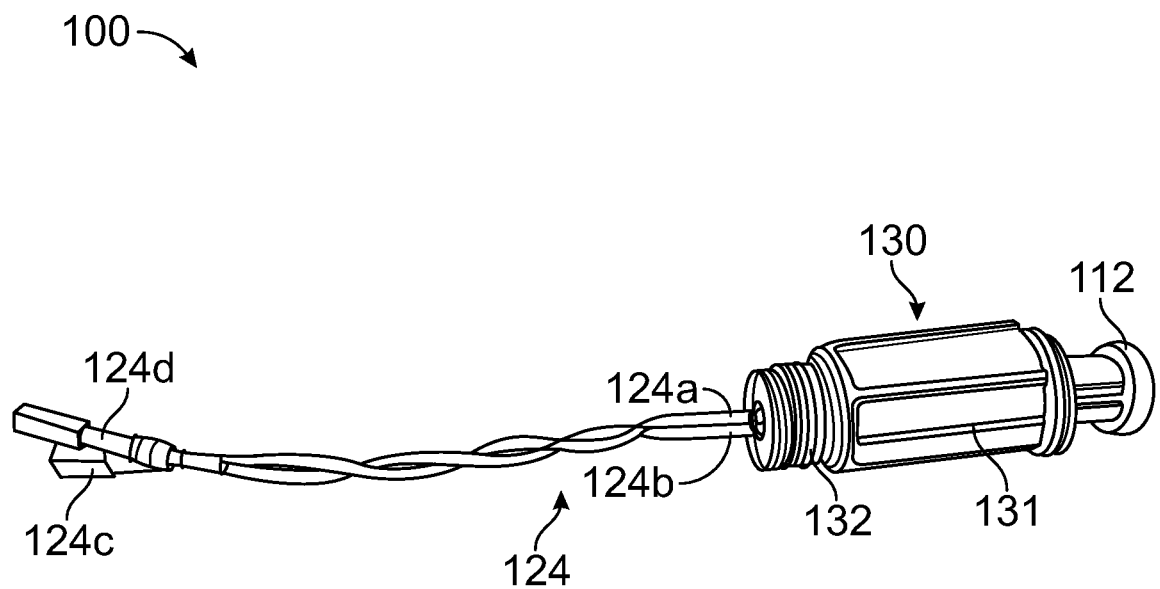
FIG. 3 illustrates a side perspective view of the vehicle theft prevention device, according to an exemplary embodiment of the present general inventive concept.

FIG. 3 illustrates a side perspective view of the vehicle theft prevention device 100, according to an exemplary embodiment of the present general inventive concept.

The vehicle theft prevention device 100 may be constructed from at least one of metal, plastic, glass, and rubber, etc., but is not limited thereto.

The vehicle theft prevention device 100 may include a switch assembly 110, an ignition disabler assembly 120, and a cover assembly 130, but is not limited thereto.

The switch assembly 110 may include a switch body 111, a connection switch 112, a contact surface 113, and a disable unit 114, but is not limited thereto.

Referring to FIG. 1, the switch body 111 is illustrated to have a cylindrical shape. However, the switch body 111 may be a rectangular prism, circular, conical, triangular, pentagonal, hexagonal, heptagonal, octagonal, or any other shape known to one of ordinary skill in the art, but is not limited thereto.

The connection switch 112 may be movably (i.e. springingly) disposed on and/or within at least a portion of a first end of the switch body 111. The connection switch 112 may move from extended away from the switch body 111 in a first position to at least partially within the switch body 111 in a second position in response to being depressed. Conversely, the connection switch 112 may move from depressed within the switch body 111 in the second position to extended away from the switch body 111 in the first position in response to extension of a spring and/or an application of force applied to the connection switch 112 away from the switch body 111 (i.e. pushing and/or pulling).

The contact surface 113 may be movably disposed on and/or within at least a portion of a second end of the switch body 111 opposite with respect to the first end. Moreover, the contact surface 113 may be connected to at least a portion of the connection switch 112. As such, the contact surface 113 may move in response to movement of the connection switch 112. For example, the contact surface 113 may move away from the switch body 111 and/or extend away from the switch body 111 in response to depressing the connection switch 112.

The disable unit 114 may include a processing unit, a communication unit, and a storage unit, but is not limited thereto.

The processing unit of the disable unit 114 (or central processing unit, CPU) may include electronic circuitry to carry out instructions of a computer program by performing basic arithmetic, logical, control and input/output (I/O) operations specified by the instructions. The processing unit of the disable unit 114 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit of the disable unit 114 may also include a microprocessor and a microcontroller.

The communication unit of the disable unit 114 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The storage unit of the disable unit 114 may include a random access memory (RAM), a read-only memory (ROM), a hard disk, a flash drive, a database connected to the Internet, cloud-based storage, Internet-based storage, or any other type of storage unit.

The disable unit 114 may be disposed within at least a portion of the switch body 111. The processing unit of the disable unit 114 may access the Internet via the communication unit to allow a user to access a website, and/or may allow a mobile application and/or the software application to be executed using the processing unit. For ease of description, the mobile and/or the software application will be hereinafter referred to as an app. The app may be downloaded from the Internet to be stored on the storage unit of the disable unit 114.

The ignition disabler assembly 120 may include a disabler body 121, a wire contact surface 122, at least one aperture 123, a plurality of connecting wires 124, and a threaded surface 125, but is not limited thereto.

Referring to FIGS. 1 and 2, the disabler body 121 is illustrated to have a cylindrical shape. However, the disabler body 121 may be a rectangular prism, circular, conical, triangular, pentagonal, hexagonal, heptagonal, octagonal, or any other shape known to one of ordinary skill in the art, but is not limited thereto. Also, a shape and/or a size of the disabler body 121 may be greater than a size and/or a shape of the switch body 111.

Referring again to FIG. 2, a first end of the disabler body 121 may receive the contact surface 113 and/or at least a portion of the switch body 111 therein, such that the disabler body 121 may at least partially cover the switch body 111 and/or the contact surface 113. In other words, the disabler body 121 may be detachably connected to at least a portion of the switch body 111 without need of a fastener (e.g., a screw, a nail, a rope, a string, a cord, a magnet, etc.).

The wire contact surface 122 may be disposed within at least portion of a second end of the disabler body 121 opposite with respect to the first end. Additionally, the wire contact surface 122 may be disposed a distance away from the contact surface 113 while the connection switch 112 is in the first position. However, the contact surface 113 may move toward and/or connect to the wire contact surface 122 in response to depressing the connection switch 112.

The at least one aperture 123 may be disposed on at least a portion of the disabler body 121 between the first end and/or the second end thereof. The at least one aperture 123 may facilitate access within an interior of the disabler body 121.

The plurality of connecting wires 124 may include a first wire 124a, a second wire 124b, a first connector 124c, and a second connector 124d, but is not limited thereto.

The first wire 124a and/or the second wire 124b may be disposed at a first end on at least a portion of the second end of the disabler body 121. Moreover, the first wire 124a and/or the second wire 124b may be connected to the wire contact surface 122.

Figure 4:
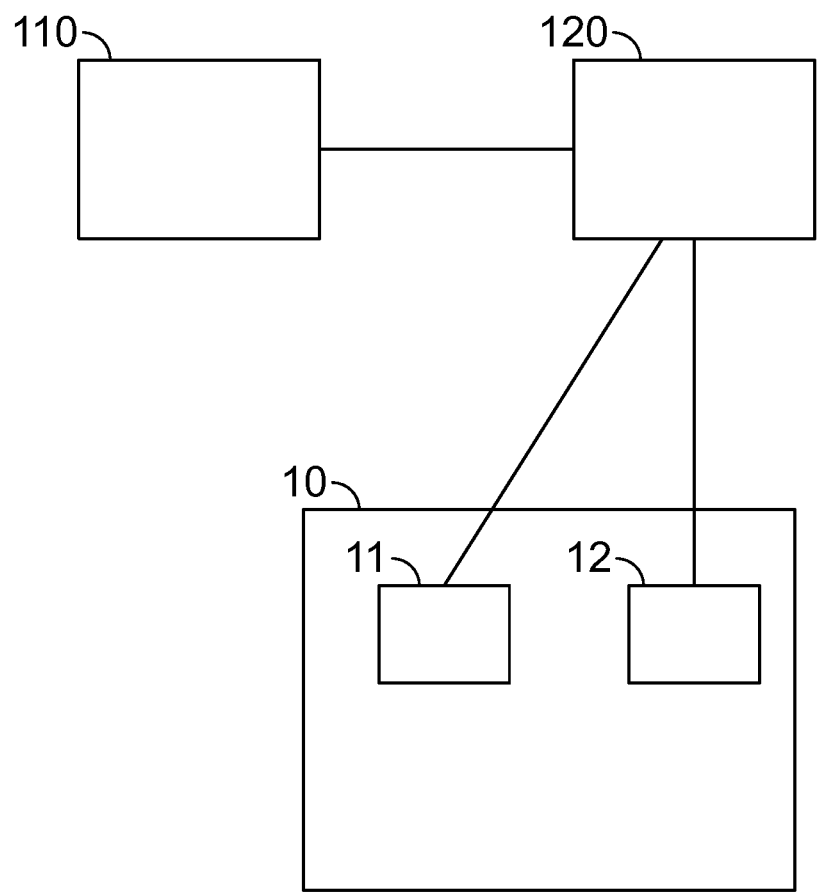
FIG. 4 illustrates a block diagram of the vehicle theft prevention device connected to a vehicle, according to an exemplary embodiment of the present general inventive concept.

FIG. 4 illustrates a block diagram of the vehicle theft prevention device 100 connected to a vehicle 10, according to an exemplary embodiment of the present general inventive concept.

The first connector 124c may be disposed on at least a portion of a second end of the first wire 124a. Similarly, the second connector 124d may be disposed on at least a portion of a second end of the second wire 124b. Furthermore, the first connector 124c may connect to an ignition switch 11 of a vehicle 10, and the second connector 124d may connect to an electronics system 12 and/or a fuel system of the vehicle 10. Therefore, the contact surface 113 may complete a circuit with the wire contact surface 122 in response to depressing the connection switch 112, such that the ignition switch 11 of the vehicle 10 and the electronics system 12 and/or the fuel system of the vehicle 10 are connected. In other words, depressing the connection switch 112 may facilitate use of a vehicle key to start the vehicle 10 (e.g., key, keyless). As such, the contact surface 113 may complete the circuit, if and only if, the contact surface 113 connects to the wire contact surface 122, such that the vehicle key to start the vehicle 10 may be used to operate the vehicle 10.

Also, the disable unit 114 may receive power from the vehicle 10 in response to the contact surface 113 connecting to the wire contact surface 122, such that the disable unit 114 via the app may emit a transponder signal to the vehicle 10 that a circuit is completed. Accordingly, the disable unit 114 may prevent (i.e., interrupt) the vehicle 10 from activating using the vehicle key and/or connecting the ignition switch 11 to the electronics system 12 by bypassing the disable unit 114, unless the circuit is complete and the transponder signal is active. As such, the disable unit 114 may prevent bypassing the ignition switch 11 to hot-wire the vehicle 10 because the circuit between the contact surface 113 and the wire contact surface 122, and the transponder signal must be active. Furthermore, the connection switch 112 may be removed and/or moved to the second position after the vehicle 10 has started while the vehicle 10 is already in operation, such that the vehicle 10 remains in operation.

The threaded surface 125 may be disposed on at least a portion of the second end of the disabler body 121.

The cover assembly 130 may include a cover body 131, a threaded surface 132, and a latching portion 133, but is not limited thereto.

Referring again to FIGS. 1 and 2, the cover body 131 is illustrated to have a cylindrical shape. However, the cover body 131 may be a rectangular prism, circular, conical, triangular, pentagonal, hexagonal, heptagonal, octagonal, or any other shape known to one of ordinary skill in the art, but is not limited thereto. Also, a shape and/or a size of the disabler body 131 may be greater than a size and/or a shape of the disabler body 121.

Referring again to FIG. 3, a first end of the cover body 131 may receive the plurality of wires 124 therethrough and/or at least a portion of the disabler body 121 therein, such that the cover body 131 may at least partially cover the disabler body 131. Moreover, the threaded surface 125 may threadably connect to an interior portion of the cover body 131. In other words, the cover body 131 may be detachably connected to at least a portion of the disabler body 121 without need of a fastener (e.g., a screw, a nail, a rope, a string, a cord, a magnet, etc.).

The latching portion 133 may be disposed on at least a portion of a second end of the cover body 131 opposite with respect to the first end. The latching portion 133 may interconnect to a cigarette port of the vehicle 10. As such, the latching portion 133 may resist removal of the cover body 131 while disposed within the cigarette port of the vehicle 10.

Therefore, the vehicle theft prevention device 100 may prevent the vehicle 10 from being stolen using hot-wiring. Also, the vehicle theft prevention device 100 may be used in older vehicles that do not have modern security systems.

The present general inventive concept may include a vehicle theft prevention device 100 detachably connected to a vehicle 10, the vehicle theft prevention device 100 including a switch assembly 110, and an ignition disabler assembly 120 connected to the switch assembly 110 and the vehicle 10 to complete a circuit between an ignition switch 11 and an electronics system 12 of the vehicle 10 in response to depressing the switch assembly 110, and prevent start of the vehicle 10 using a vehicle key while the circuit between the ignition switch 11 and the electronics system 12 is incomplete.

The switch assembly 110 may include a switch body 111, a connection switch 112 movably disposed on and within at least a portion of a first end of the switch body 111 to move from extended away from the switch body 111 in a first position to at least partially within the switch body 111 in a second position in response to being depressed, and move from depressed within the switch body 111 in the second position to extended away from the switch body 111 in the first position, and a contact surface 113 movably disposed on and within at least a portion of a second end of the switch body 111 and connected to at least a portion of the connection switch 112 to move in response to movement of the connection switch 112.

The switch assembly 110 may further include a disable unit 114 disposed within at least a portion of the switch body 111 to emit a transponder signal to the vehicle 10 that a circuit is completed in response to depressing the connection switch 112, and prevent turning on the vehicle 10 using a vehicle key or bypassing the disable unit 114 unless the contact surface 113 completes the circuit.

The ignition disabler assembly 120 may include a disabler body 121 to receive the contact surface 113 through a first end of the disabler body 121, and a wire contact surface 122 disposed within at least portion of a second end of the disabler body 121 to connect to the contact surface 113 in response to depressing the connection switch 112.

The contact surface 113 may be disposed a distance away from the wire contact surface 122 while the connection switch 112 is in the first position.

The ignition disabler assembly 120 may further include a plurality of wires 124 disposed on at least a portion of the disabler body 121 to connect the wire contact surface 122 to the ignition switch 11 and the electronics system 12 of the vehicle 10.

The vehicle theft prevention device 100 may further include a cover assembly 130 detachably connected to the ignition disabler assembly 120 to at least partially cover the ignition disabler assembly 120.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A vehicle theft prevention device detachably connected to a vehicle, the vehicle theft prevention device comprising:
   a switch assembly; and
   an ignition disabler assembly connected to the switch assembly and the vehicle to complete a circuit between an ignition switch and an electronics system of the vehicle in response to depressing the switch assembly, and prevent start of the vehicle using a vehicle key while the circuit between the ignition switch and the electronics system is incomplete, such that the ignition disabler assembly completes the circuit only in response to depressing the switch assembly into the ignition disabler assembly.

2. The vehicle theft prevention device of claim 1, wherein the switch assembly comprises:
   a switch body;
   a connection switch movably disposed on and within at least a portion of a first end of the switch body to move from extended away from the switch body in a first position to at least partially within the switch body in a second position in response to being depressed, and move from depressed within the switch body in the second position to extended away from the switch body in the first position; and
   a contact surface movably disposed on and within at least a portion of a second end of the switch body and connected to at least a portion of the connection switch to move in response to movement of the connection switch.

3. The vehicle theft prevention device of claim 2, wherein the switch assembly further comprises:
   a disable unit disposed within at least a portion of the switch body to emit a transponder signal to the vehicle that a circuit is completed in response to depressing the connection switch, and prevent turning on the vehicle using a vehicle key or bypassing the disable unit unless the contact surface completes the circuit.

4. The vehicle theft prevention device of claim 2, wherein the ignition disabler assembly comprises:
   a disabler body to receive the contact surface through a first end of the disabler body; and
   a wire contact surface disposed within at least portion of a second end of the disabler body to connect to the contact surface in response to depressing the connection switch.

5. The vehicle theft prevention device of claim 4, wherein the contact surface is disposed a distance away from the wire contact surface while the connection switch is in the first position.

6. The vehicle theft prevention device of claim 4, wherein the ignition disabler assembly further comprises:
   a plurality of wires disposed on at least a portion of the disabler body to connect the wire contact surface to the ignition switch and the electronics system of the vehicle.

7. The vehicle theft prevention device of claim 1, further comprising:
   a cover assembly detachably connected to the ignition disabler assembly to at least partially cover the ignition disabler assembly.

8. A vehicle theft prevention device detachably connected to a cigarette port of a vehicle, the vehicle theft prevention device comprising:
   a switch assembly;
   an ignition disabler assembly connected to the switch assembly and the vehicle to complete a circuit between an ignition switch and an electronics system of the vehicle in response to depressing the switch assembly, and prevent start of the vehicle using a vehicle key while the circuit between the ignition switch and the electronics system is incomplete; and
   a cover assembly, comprising:
      a cover body detachably connected to the ignition disabler assembly to at least partially cover the ignition disabler assembly, and
      a latching portion disposed on at least a portion of the cover body to prevent removal of the cover body from the cigarette port.

* * * * *